May 21, 1940.  P. SUBKOW  2,201,306
PROCESS FOR THE REFORMING AND POLYMERIZATION OF HYDROCARBONS
Filed Aug. 12, 1935
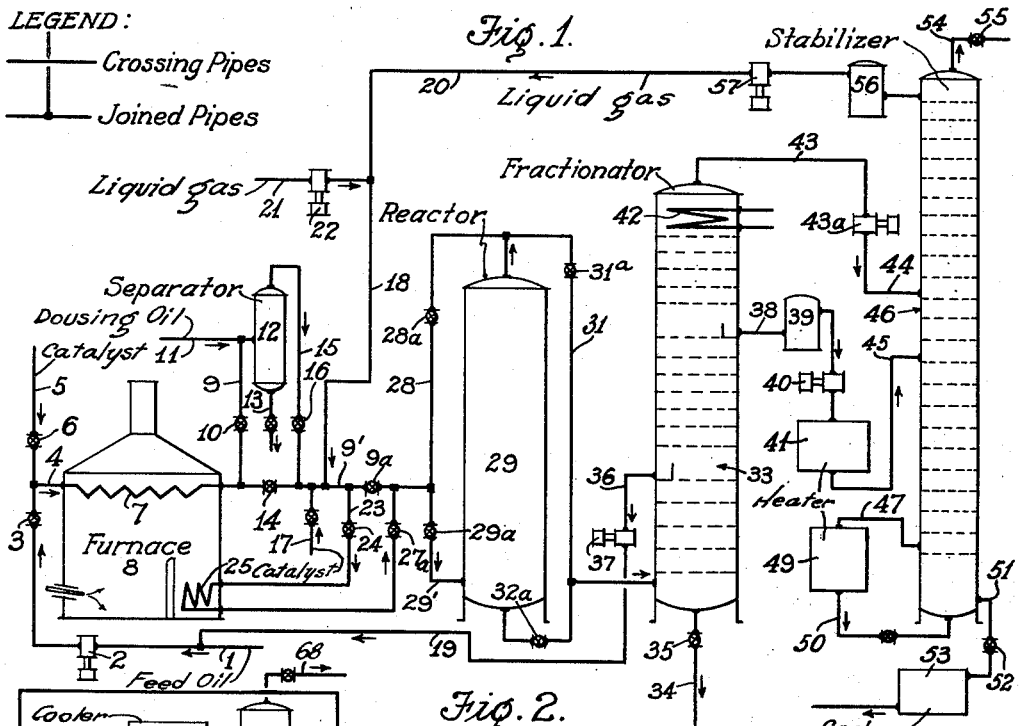
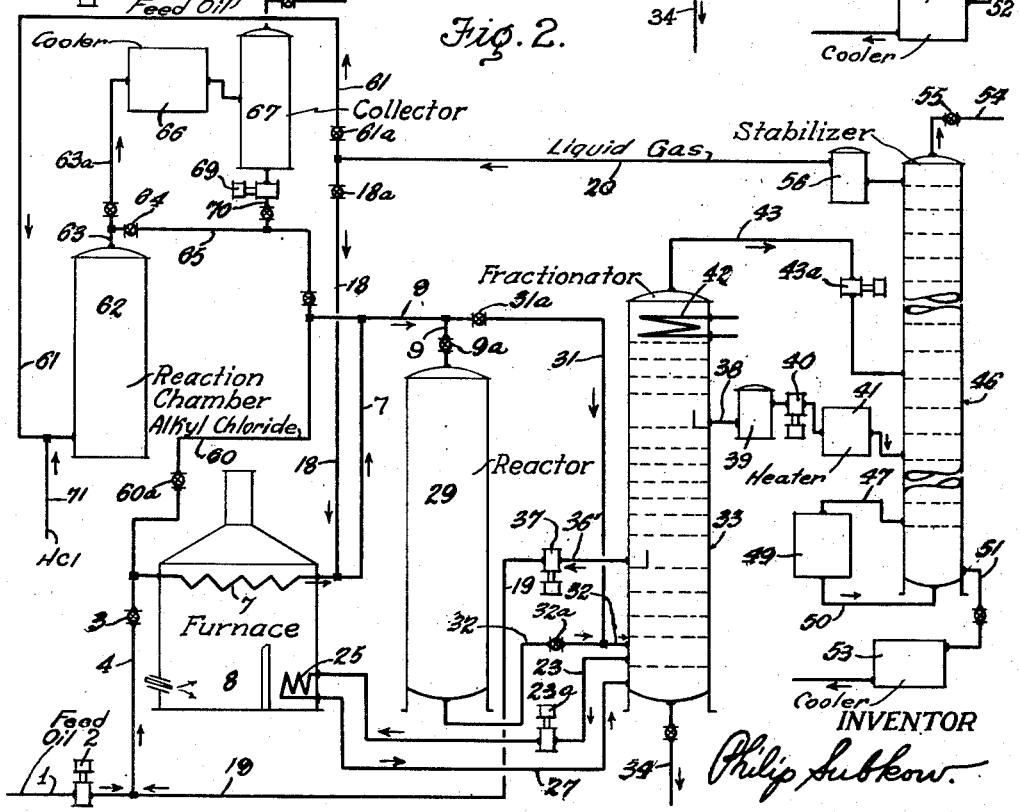
INVENTOR
Philip Subkow.

Patented May 21, 1940

2,201,306

UNITED STATES PATENT OFFICE 2,201,306

PROCESS FOR THE REFORMING AND POLYMERIZATION OF HYDROCARBONS

Philip Subkow, West Los Angeles, Calif., assignor to Union Oil Company of California, Los Angeles, Calif., a corporation of California Application August 12, 1935, Serial No. 35,702

9 Claims. (Cl. 196—9)

This invention relates to a process for the formation of high anti-knock gasoline, and particularly to a process for the conversion of low anti-knock gasoline to high anti-knock gasoline by a modification of the process known as "reforming" which utilizes recombining and polymerizing reactions as well as decomposing reactions. The process of this invention combines the processes for the conversion of high molecular weight into lower molecular weight hydrocarbons, known as "cracking," "dehydrogenating" and "reforming," with processes for building hydrocarbons of high anti-knock quality from low molecular weight hydrocarbons, particularly those which are normally gaseous at atmospheric temperatures and pressures, and known as "polymerization" or "synthesis," and processes for obtaining improved anti-knock qualities by molecular rearrangement, known as "isomerization."

The conventional process for reforming gasoline consists in subjecting hydrocarbons in the gasoline range, preferably in vaporous form, to high temperatures, under which conditions the gasoline is converted from one having low anti-knock properties to one having high anti-knock properties. The gasoline is then separated from the fixed gases and normally gaseous hydrocarbons to form a stabilized and reformed gasoline. This process for the formation of high iso-octane number material is visualized as proceeding through cracking, dehydrogenating and isomerizing reactions which yield as an intermediate or by-product, low molecular weight olefinic fractions and chemical radicals with unsatisfied valences called residuals. In conventional reforming operations there is no attempt to control the subsequent polymerization of these materials to retain and conserve those desirable anti-knock characteristics and to polymerize the gaseous residuals to liquid hydrocarbons of high anti-knock value. The process of this invention provides for controlled polymerization and conservation of these residuals and olefins, particularly those of the ethylenic type, in the reaction zones, thus favoring continued decomposition of the petroleum hydrocarbons and increased yield of high octane material over that resulting from a simple reforming operation. A reformed gasoline containing increased percentages of polymer gasoline of high octane value results.

The reactions here generically termed "polymerization" include alkylation reactions wherein saturated hydrocarbons combine with unsaturated hydrocarbons to form higher molecular weight branched chain hydrocarbons or alkylation reactions between aromatics and unsaturated low molecular weight hydrocarbons such as ethylene, propene or butene, or straight polymerization reactions wherein olefins such as mono- or diolefins are polymerized to higher molecular weight polymers. Isomerization, although not strictly a polymerization reaction in the sense that higher molecular weight bodies are formed, is included within this term since it occurs along with such polymerization reactions. The term "polymerization" as here used is intended to embrace these types of reactions for building higher molecular weight bodies by reaction of lower molecular weight hydrocarbons. The gasoline produced by this process is termed "polymer" gasoline, and when produced as a mixture with reformed gasoline it is here termed "reformed and polymer" gasoline.

The term "reforming" is intended to embrace the reactions of cracking or decomposition, dehydrogenation and isomerization by which low octane material of gasoline or higher boiling range is converted into gasoline fractions of high anti-knock properties.

The object of this invention is to reform gasoline under such conditions that along with the cracking, dehydrogenating, and isomerizing operations there is a parallel, subsequent, or conjoint polymerizing reaction where the gases formed or added to a reforming operation are converted into polymerized materials, and a blend of reformed and polymer gasoline is formed directly in the process. Broadly stated, the invention consists in reforming liquid hydrocarbons, and particularly hydrocarbons in the gasoline range, to produce hydrocarbons having boiling points in the gasoline range and vapors containing hydrocarbons of five or less carbon atoms, which vapors are polymerized, separately if desired, but preferably in the presence of the gasoline fractions produced by the reforming operation.

The invention also contemplates the addition of hydrocarbons having five or less carbon atoms to the gasoline from the reforming operation and passing to the polymerization zone in order to increase the concentration of gasoline hydrocarbons.

Normally gaseous hydrocarbons such as propane, butane, propylene or butylen may be polymerized. Instead of using the hydrocarbons having four or less carbon atoms, stabilized natural gasoline containing these fractions may be employed. It is preferred, however, to use hydrocarbons of the unsaturated type. Sources of such gases are processes in which gas oil and/or fuel oil are cracked at temperatures below 1000° F., that is, in the neighborhood of 850–950° F.

The reforming operation, which is at least partially a combined cracking, dehydrogenating and isomerizing operation, may be aided by choice of conditions of temperature and pressure and rate of feed and by selection of catalysts. In general, high temperatures, short time, and moderate pressures are desirable. Temperatures may range from 650–1850° F., but the range from 850–1200° F. is preferred. Pressures ranging from atmospheric to 1500 lbs. may be used, but low pressures, as for instance, in the neighborhood of 5–30 atmospheres, are to be preferred. Reforming catalysts for the above process, of which have been found useful for this purpose are:

*Metals.*—Nickel, palladium, platinum, copper, cobalt, iron, zinc, titanium, aluminum, tungsten, molybdenum, thorium;

*Sulfides.*—Cobalt, iron, zinc, nickel, manganese, tungsten;

*Oxides.*—Alkali metals such as calcium, magnesium, barium, aluminum, chromium, zinc, manganese, silica;

*Hydroxides.*—Chromium, alkali metal;

*Acids.*—Molybdic, tungstic, chromic, phosphoric, arsenious, silica, boric;

*Salts.*—Aluminates, chromates, tungstates, vanadates, uranates, phosphates, of the alkali earth metals such as calcium; and the phosphates, chromates and vanadates of aluminum, chromium or zinc; phosphates of molybdenum, tungsten; ammonium molybdate, aluminum sulfate; adsorbents like fuller's earth, bentonite;

*Adsorbent charcoal* or other adsorbent carbons;

*Halides* such as aluminum chloride, iron chloride, aluminum bromide and iron bromide.

When hydrocarbon fractions having a boiling range up to about 600–650° F. are passed over these catalysts at temperatures from 662–1832° F. a reforming reaction occurs. In producing gasoline containing olefinic materials temperatures of about 850–1050° F. may be employed. Higher temperatures in the neighborhood of 1380–1830° F. favor aromatic formation. The salts and oxides of the difficultly reducible metals, as for instance, the alkali metals such as calcium, magnesium, barium, require in general higher temperatures for the formation of olefins, i. e., temperatures in the neighborhood of 1020–1380° F. The gases resulting may then be reacted in the presence of a polymerizing catalyst.

Catalysts which have been found to aid polymerization are termed "polymerizing catalysts." Such catalysts are fuller's earth, absorbent carbon, phosphorous acids such as orthophosphorous acid, and phosphoric acid such as orthophosphoric acid. In solid form, aluminum oxide, calcium oxide, carbonates of the alkaline metals, the oxides and carbonates of magnesium or beryllium, the acids of boron and antimony, thoria, zinc chloride or aluminum chloride, cadmium phosphate, aluminum sulfate in solid form, adsorbent clays like bentonite, graphite, charcoal, copper, alkali metal salts (especially oxygen-containing salts), phosphates, borates, antimonates, boron trifluoride, either alone or as a double compound with ethylene in the form of ethylene fluoboric acid, cadmium phosphate, and siliceous earths, tin, zinc, aluminum, chromium, silicon, lead or alloys of these metals.

In using catalysts to be carried in the stream of gases, the catalyst, if it is boron fluoride, may be fed as a gas to this stream or mixed in the liquid state at low temperature. If the catalysts are solid they are best ground fine and carried in suspension by mixing with the liquid feed and carried along by the high velocity of the vapors. The solid catalyst may also be positioned as a contact mass in the reaction zone and the vapors passed through the body or catalyst.

Higher pressures favor the polymerization reaction and therefore, by the amplification of pressure, the tolerable temperature for polymerization is increased. At the same time pressure tends to decrease the reforming operation, and the two operations may be brought closer together by the application of pressure. By choosing a temperature intermediate the preferred reforming and polymerization reaction temperature at atmospheric pressure, and applying high pressure in the neighborhood of 1000–5000 lbs. the same catalyst may be used for both reactions. It may be chosen to use a catalyst or catalyst mixtures whose temperature at which they accelerate the reforming operation, and the temperature at which they accelerate the polymerization operation do not lie far apart. Thus, for instance, one may choose catalysts which are active, i. e., promote or accelerate, in reforming at temperatures in the neighborhood of 840–1060° F., and choose catalysts which are active in, i. e., promote or accelerate, the polymerizing reaction at temperatures ranging from about 570–840° F. at pressures ranging as low as atmospheric.

The liquid gases may be washed with alkali to free them of hydrogen sulfide and they can then be charged. The charging stocks to the reforming operation may contain organic sulfur bodies which will poison the catalyst. One may either remove these bodies or use a catalyst which will not be poisoned in these bodies.

A good catalyst for the polymerization reaction is aluminum oxide preferably in the form of fuller's earth or artificial fuller's earth formed by co-precipitating silica and aluminum oxide from a mixture of sodium silicate and aluminum sulfate. The aluminum silicate is washed neutral and dehydrated. It is preferred that the mixture be neutral or acid, and free of alkaline material. It is best that the catalyst be substantially free from water, dehydrated by heating, although a small percentage, up to 5 or 6% of moisture is not detrimental. In using this catalyst it has been found that a small amount of hydrochloric acid introduced as alkyl chloride, as for instance, isopropyl chloride may be introduced to aid the polymerization reaction. Apparently, the isopropyl chloride is decomposed in the reaction zone and forms free hydrochloric acid.

It has been found that the alkyl chlorides are conveniently formed by passing a mixture of unsaturated hydrocarbons such as butylene and propylene over the above fuller's earth type catalysts as previously disclosed at ordinary temperatures from about 200–400° F. The alkyl chloride may be introduced either in vapor form as produced by the chlorinating reaction, or first condensed, and then introduced in liquid form. The amount of alkyl chloride required varies from one-tenth to one per cent, preferably to about one-half percent of the reaction vapors.

It is an object of this invention to form a reformed or cracked and polymer gasoline by subjecting gasoline, kerosene and heavier hydrocarbons to a reforming or cracking process and to subject light hydrocarbons to a polymerizing reaction to form a polymer gasoline, and to combine and rectify the two to produce a reformed or cracked and polymer gasoline.

It is another object of this invention to subject gasoline and kerosene and heavier petroleum fractions to a reforming operation in the presence of a catalyst which will aid the polymerization of the lighter hydrocarbon fractions, and particularly, those which are normally gaseous in the reforming operation.

It is a further object of this invention to subject gasoline and kerosene and heavier petroleum fractions in the presence of a normally gaseous hydrocarbon to a reforming or cracking and polymerization reaction, preferably, in the presence of catalysts which will accelerate and aid the reforming or cracking and polymerization reactions.

It is a further object of this invention to subject gasoline and kerosene and heavier petroleum fractions to a reforming or cracking operation and then to subject the product of the reforming operation to a polymerizing reaction, preferably in the presence of a polymerization catalyst.

It is a further object of this invention to subject gasoline and kerosene and heavier petroleum fractions to a reforming or cracking operation, and then to subject the product of the reforming or cracking operation in the presence of added normally gaseous hydrocarbons to a polymerization reaction, preferably in the presence of a polymerization catalyst.

It is a further object of this invention to subject gasoline and kerosene and heavier petroleum fractions to a reforming or cracking and polymerization reaction in the presence of a reforming or cracking and polymerization catalyst under such high pressure conditions and such conditions of temperature that the polymerization and reforming or cracking operations are both aided by the presence of the polymerization and reforming or cracking catalysts.

It is a further object of this invention to subject gasoline and kerosene and heavier petroleum fractions to a reforming or cracking operation and subsequently to a polymerization operation under such conditions of temperature and pressure that the reforming operation is carried out at a higher temperature than the polymerization operation wherein the reformed or cracked gasoline composed of gasoline and kerosene fractions, and containing normally gaseous hydrocarbons are subject to a lower temperature for polymerization of the polymerizable hydrocarbons at that temperature and pressure.

This invention will be better understood by reference to the sub-joined figures in which:

Figure 1 is a flow sheet showing the polymerization and reforming reactions and providing for withdrawal and the addition of a catalyst at an intermediate point in the reaction;

Figure 2 shows a stage reforming and polymerization reaction in which a catalyst is added to the reaction undergoing polymerization.

Figure 1 represents a schematic flow sheet of a combined reforming and polymerization process in which the reforming is primarily conducted in one zone at relatively higher temperature and polymerization in another zone of relatively lower temperature. In Figure 1 gasoline, kerosene, or gas oil fractions having end points under 600°–650° F. to be reformed or cracked is fed through line 1 by pump 2 through valve 3 and line 4 into the reforming or cracking coil 7 in furnace 8. The reforming catalyst may be added before passage to the heating coil through line 5 controlled by valve 6. The mechanism for the addition of the solid catalyst to the oil stream is shown schematically as indicated. Mechanisms for the addition of solid material to liquid being well known in the chemical engineering art. The reforming catalyst may be one of the previously mentioned catalysts or may be a mixture of reforming or cracking and polymerization catalysts. The temperature of the reforming operation will be chosen to correspond with the catalyst used in accordance with the principles hereinabove discussed.

The reforming stream containing the catalysts may be treated in one of two ways. If the prior reforming operation was made in the presence of a catalyst or catalyst mixtures different from those which it is desired to have present in the polymerization zone, the stream is by-passed by closing valve 14 and opening valves 10 and 16. The stream of catalyst and oil vapor is then passed through line 9 and meets oil residuum such as fuel oil to act as a dousing medium to wash out entrained catalysts and separate the vapors from the dousing medium in the separator 12. The temperature maintained in the separator is about 500° F. to insure the vaporization of the gasoline fractions. The mixture of oil and catalyst is removed through line 13, and the vapors of gasoline and lighter fractions including the hydrocarbons of four and less carbon atoms, pass through line 15 and valve 16 into line 9. However, if it is desired that the catalyst present in the reforming or cracking coil 7 and catalysts entrained in the vapors passing therethrough be also present in the polymerization zone, valves 10 and 16 remain closed and valve 14 is open. In the event the operation in chamber 12 is carried out, additional catalysts may be added through line 17 or provided as catalytic mass in the reactor chamber 29. It may be found desirable to add fresh catalysts to the reaction mixture. Also, in the event that the operation in chamber 12 is not carried out, the reaction mixture passes through line 9' in order to increase the concentration of active catalysts in the reaction mixture.

The reforming operation may be carried out with the omission of catalyst introduction through 5, and the entire reformed mixture may be passed either through 14 or by-passed to 12 and the separated gasoline sent to reactor chamber 29 in the same manner as previously described. The catalyst added through 17 is preferably chosen from among the polymerization catalysts herein previously disclosed. In order to increase the concentration of light hydrocarbons there may be added through line 18 liquid gases produced in the stabilizer 46 as will be hereinafter described. There may be also added at this point liquid gases from an extraneous source through line 21 and pump 22. These gases are preferably propenes, butenes, ethylene, or mixtures of these hydrocarbons with the saturated hydrocarbons of four or less carbon atoms. The mixture is formed in line 9'. In the event that the cooling operation in chamber 12 and the cooling effected by the addition of the liquid material through line 18 and vaporization of this material has reduced the temperature below the chosen reaction temperature, the mixture may be by-passed through line 23 and reheating coil 25 in furnace 8 by the proper manipulation of valves 9a, 24 and 27. This control heater will then adjust the temperature in line 28 to the proper reaction temperature to be maintained in reactor 29. In the event that the reactor does not contain the mass catalysts in the form of a contact mass in the chamber, it becomes merely a reaction chamber to give reaction time to the mixture. In operating the reactor without the catalyst mass it would be advisable to direct the flow of vapors and entrained catalyst downwardly by adjusting the valves 28a in lines 28 and valved line 29' and valves 31a in line 31 and 32a so that the flow will be downward through the reactor and into fractionator 33. If the catalyst contact mass is used it may be desirable to flow the vapors upwardly through the reactor and in which case by proper manipulation of the valves 29a, 28a, 31a and 32a, the flow may be properly directed. Gasoline thus formed will result from the reforming reactions operating on the charge to coils 7 and on polymerization of the reformed vapors and gases.

The reformed and polymer gasoline then passes through fractionator 33 containing the usual reflux cooler 42 which may be either internal or external. The heavy fraction, containing the suspended catalyst if this is combined in the vapors is removed from the tower through line 34 controlled by valve 35. The heavy gasoline fraction is removed through line 36, pump 37 for recycling to the reforming operation via line 19 or is removed from the system partially or totally. The reformed and polymer gasoline is removed through side stream take-off 38 into tank 39, passed by pump 40 through heater 41 and line 45 into the stabilizer 46. Uncondensed gas from the fractionator passes through line 43, compressor 43a and line 44 into the stabilizer 46. The gasolines and gas are separated into a stabilized gasoline removed through line 51, valve 52, and cooler 53 and the liquid gas fraction containing butanes, butylenes, propanes, propylenes, some ethane and ethylenes in liquid form pass into tank 56 and circulate by pump 57 through line 20 as previously described. Heat is supplied to the bottom of the tower by circulation from a lower tray through line 47, heater 49, and returned through line 50. The uncondensed and fixed gases are removed through line 54, controlled by valve 55.

The conditions to be maintained in heater 7 and in the reactor 29 are those previously described and must be adjusted for the stock and catalyst employed as will be well understood in the art.

In carrying out the process shown in Figure 1, any one of the catalysts here described may be employed, but the flow wi'l be explained using one of the catalysts merely to illustrate the principle of carrying out the reaction.

It will be understood that the other catalysts may be used with the proper control of temperature and pressure according to the principles hereinabove fully described.

A kerosene fraction having an end point of about 550° F. is passed through line 3 and is intimately incorporated to form a slurry with molybdic acid, molybdenum sulfide, or calcium aluminate, and is heated to a temperature of about 930 to 1290° F. in coil 7. The mixture is then passed through line 9 into chamber 12 in which the catalyst and the oil is withdrawn and the vapors at a temperature of about 450° F. are withdrawn through line 15. Material is added through line 18 and the mixture at a temperature of about 350 to 400° F. is introduced into chamber 29 which is charged with a phosphoric acid catalyst in the form of orthophosphoric acid deposited upon a fuller's earth base. The pressure maintained in the coil 7 and the chamber 29 is about 500 to 1000 lbs.

Figure 2 shows an operation of reforming and polymerization wherein the reactions occur in the presence of an activating material which acts as a catalyst to the reaction, or in the presence of an extraneous material which aids in producing improved characteristics in the final product. As previously described the catalysts may be either added to the material entering the reforming operation or present in the reforming tubes or may be placed in the polymerization reactor. If the gas stream contains catalysts, it passes together with the catalysts through the polymerization reactor. It has been found that on using polymerization and reforming catalysts of the adsorbent clay type, such as fuller's earth or on using base catalysts like aluminum oxide, hydrochloric acid gas or alkyl chlorides which react at the temperature reaction in the presence of these catalysts activate these catalysts. It has been found additionally, that these alkyl chlorides are themselves quite readily polymerized into higher molecular weight hydrocarbons or chlorinated hydrocarbons. While this polymerization is shown as occurring in a catalyzed reaction, the alkyl chloride with or without mixture with the hydrocarbon feed as here shown, may be polymerized in tubes 7 in an uncatalyzed reaction. The action in reactor 29 if desired may be catalytic or the end product of the uncatalyzed polymerization in 7 may be digested to aid polymerization in chamber 29 free of catalyst.

In carrying out the process shown in Figure 2 the feed is described as being made up of gasoline fractions to which may be added the alkyl chlorides. It is of course possible that the feed may be composed of alkyl chlorides alone. However, it is preferred to operate the process in Figure 2 whereby the alkyl chlorides are added to the gasoline and in the event the alkyl chlorides are used as a promoter in the catalytic polymerization reaction they will be added to the reaction mixture entering the polymerization zone. Heavy gasoline or kerosene pass through line 1, pump 2, to be passed with stock added through line 19 and pass then into line 4 and valve 3 into reforming coils 7 in furnace 8. Alkyl halides may be fed through line 60 and valve 60a into reaction coil 7, or in the event that the feed is composed entirely of these halides, material is not introduced in line 1. If it is desired instead of feeding halides through line 60, valve 60a may be closed and the halides may be introduced into line 9. Polymerization catalyst is introduced into the stream passed into line 4 as previously described by any well known solid feeding mechanism. The point of introduction should be prior to the introduction of the stream into coil 7 unless the catalyst is contained inside the coils. Reformed or cracked material passes through line 9. Before entering line 9 is meets liquid gas introduced through line 18. These liquid gases may be introduced from stabilizer 46 as later described or may come from an extraneous source or may be both. The reactor 29 may be used either as an additional contact catalytic zone in which case the catalyst is maintained in the reactor as a contact mass or the reactor may be empty and merely provide reaction time. The material passes through line 9 controlled by valve 9a and through the reactor 29, passes through line 32 and valve 32a to fractionator 33. In the event that reaction is completed in coils 7, reactor may be by-passed by closing valves 9a and 32a and the vapors passed through line 31, controlled by valve 31a directly into fractionator 33. In fractionator 33 material is separated into a heavy residual fraction and is withdrawn through line 34. The bottoms are reheated by circulation through lines 23, pump 23a, heater 25 and line 27. Incompletely converted gasoline is withdrawn through line 36 and pump 37 to act as recycle stock as previously described. The reformed and polymer gasoline is withdrawn through line 38 into tank 39 and passed through pump 40 and heater 41 to stabilizer 46. The gases uncondensed by cooler 42 pass through line 43, compressor 43a into stabilizer 46. In stabilizer 46 the gasoline and gases are separated into a stabilized, reformed and polymerized gasoline which is withdrawn through line 51 and cooler 53. Bottoms are circulated through line 47, heater 49 and line 50 to provide heat in the base of the column. Liquid fractions composed of butane, butylene, propane, propylene, ethane and ethylene are withdrawn in liquid form into tank 56 and passed to line 20 into line 61 as will be hereinafter described. The uncondensed and fixed gases are withdrawn through line 54 controlled by valve 55, cooled and condensed to provide a reflux to column 46. The liquefied gases are withdrawn through line 20 to which may be added from an extraneous source, preferably unsaturated normally gaseous hydrocarbons or mixtures of said hydrocarbons and saturated normally gaseous hydrocarbons. The gases may be separated in the following fashion: A portion may be introduced through line 18 and valve 18a as previously described. Another portion may be passed through line 61 controlled by valve 61a to the reaction chamber 62 for conversion into the halide.

It has been found that unsaturated hydrocarbons in the nature of propylene, butylene, amylene will react with hydrochloric acid in the presence of activated fuller's earth or aluminum oxide at temperatures from 32–390° F. to form alkyl halide. Propylene will add in the presence of hydrochloric acid at temperatures from 32–390° F. to hydrochloric acid very smoothly. The alkyl chloride thus formed may be introduced into the reaction stream by passing through line 63, valve 64 and line 65. In passing through 65 it passes as a vapor and may be introduced into line 9 to activate the polymerization in reactor 29. It has been found that as much as from one-tenth to five-tenths percent of isopropyl chloride when added to the gases entering the polymerizer reactor chamber 29 accelerates polymerization reaction markedly. The chloride may be passed via line 60 and valve 60a into coils 7. Instead of passing the isopropyl chloride as a vapor the isopropyl chloride may be condensed by passing through line 63a, valve 64 remaining closed to cooler 66, collector 67 and uncondensed gases may be removed through valved line 68, the condensate is fed by pump 69 through valved line 70 as previously described. The hydrochloric acid may be added into the steam entering the reactor 62 through line 71. In operating in the presence of isopropyl chloride, it would be advisable to insure that the gases and liquid are moisture free. Provision will have to be made for separating free hydrochloric acid from the gases in 54 and from the various condensates withdrawn from the system by treatment with sodium hydroxide.

The catalyst employed may be fuller's earth or aluminum oxide, and preferably, the aluminum oxide formed by the co-precipitation of alumina and silica by the interaction of sodium silicate and aluminum sulfate, as previously described. Reaction chamber 62 is charged with activated fuller's earth or aluminum oxide as previously described. The temperature maintained in reactor 62 is as described, under 390° F. Dry hydrochloric acid gas is fed through 71 and alkyl chloride is introduced into line 18. The material entering line 4 is a slurry of the fuller's earth or aluminum oxide and oil. The temperature maintained in reactor 7 is in the neighborhood of 930–1020° F. and the temperature in reactor 29 is from 640–730° F. This temperature is maintained by the introduction of material through 18 or through cooling the gases entering through 9 by an interchanger, as will be understood although not shown in the drawing, or by the control in the reactor 29 as shown in Figure 3. Cooling in line 9 may be provided as shown in Figures 3, 4 and 6. Pressure maintained in reactors 7 and 29 is in the neighborhood of 500–1500 lbs.

The foregoing description of the several modifications of my invention described above are not to be considered as limiting since many variations may be made within the scope of the following claims by those skilled in the art without departing from the spirit thereof.

I claim:

1. A process for the production of a polymer and reformed gasoline which comprises commingling a hydrocarbon fraction within the gasoline range with an alkyl halide and heating said mixture in a confined stream to a reforming temperature, passing said mixture into a reaction chamber maintained at a lower temperature than said reforming temperature and therein subjecting said mixture to polymerization and subsequently separating a reformed and polymer gasoline from said mixture.

2. A process for the production of a polymer and reformed gasoline which comprises commingling a hydrocarbon fraction within the gasoline range with an alkyl halide and heating said mixture in a confined stream to a reforming temperature, commingling said mixture with a normally gaseous hydrocarbon and passing said mixture to a reaction chamber and therein subjecting the mixture to polymerization and subsequently separating a reformed and polymer gasoline from said mixture.

3. A process as in claim 2 in which said reforming temperature is approximately 930–1020° F. and said polymerization temperature is approximately 640–730° F.

4. A process for the production of cracked and polymer gasoline which comprises commingling a normally liquid hydrocarbon fraction with an alkyl halide and heating said mixture to a cracking temperature, passing said mixture into a reaction chamber maintained at a lower temperature than said cracking temperature and therein subjecting said mixture to polymerization and subsequently separating a cracked and polymer gasoline from said mixture.

5. A process as in claim 4 in which said alkyl halide comprises an alkyl chloride.

6. A process as in claim 4 in which said alkyl halide comprises isopropyl chloride.

7. A process for the production of cracked and polymer gasoline which comprises commingling a normally liquid hydrocarbon fraction with an alkyl halide and heating said mixture to a cracking temperature, commingling said mixture with a normally gaseous hydrocarbon and passing said mixture to a reaction chamber and therein subjecting the mixture to polymerization and subsequently separating a cracked and polymer gasoline from said mixture.

8. A process as in claim 7 in which said alkyl halide comprises an alkyl chloride.

9. A process as in claim 7 in which said alkyl halide comprises isopropyl chloride.

PHILIP SUBKOW.